United States Patent [19]
Swenson

[11] Patent Number: 5,390,646
[45] Date of Patent: Feb. 21, 1995

[54] SECOND STAGE INTERCOOLING WITH PHASE CHANGE HEAT TRANSFER FLUID

[75] Inventor: Paul F. Swenson, Shaker Heights, Ohio

[73] Assignee: Consolidated Natural Gas Service Company, Inc., Pittsburgh, Pa.

[21] Appl. No.: 174,795

[22] Filed: Dec. 29, 1993

[51] Int. Cl.6 .............................................. F02N 21/02
[52] U.S. Cl. ................................... 123/525; 123/528; 123/563
[58] Field of Search ............... 123/525, 526, 527, 528, 123/563

[56] References Cited

U.S. PATENT DOCUMENTS 5,081,977  1/1992  Swenson .............................. 123/527

Primary Examiner—Raymond A. Nelli
Assistant Examiner—Erick Solis
Attorney, Agent, or Firm—Pearne, Gordon, McCoy & Granger

[57] ABSTRACT

An air-fuel supply system for an internal combustion engine in which fuel, such as natural gas, is stored in a fuel tank as a cryogenic liquid, and in which supply air is compressed. The charge air is intercooled to increase its density and, therefore, engine performance. Heat from the intercooling process is utilized to vaporize the liquid natural gas fuel. Heat exchange from the charge air to the liquid natural gas is accomplished with a phase changing heat transfer fluid. The heat transfer fluid boils at the intercooler and condenses at the fuel vaporizer to give precise temperature control at the intercooler surfaces without frost build-up.

4 Claims, 1 Drawing Sheet

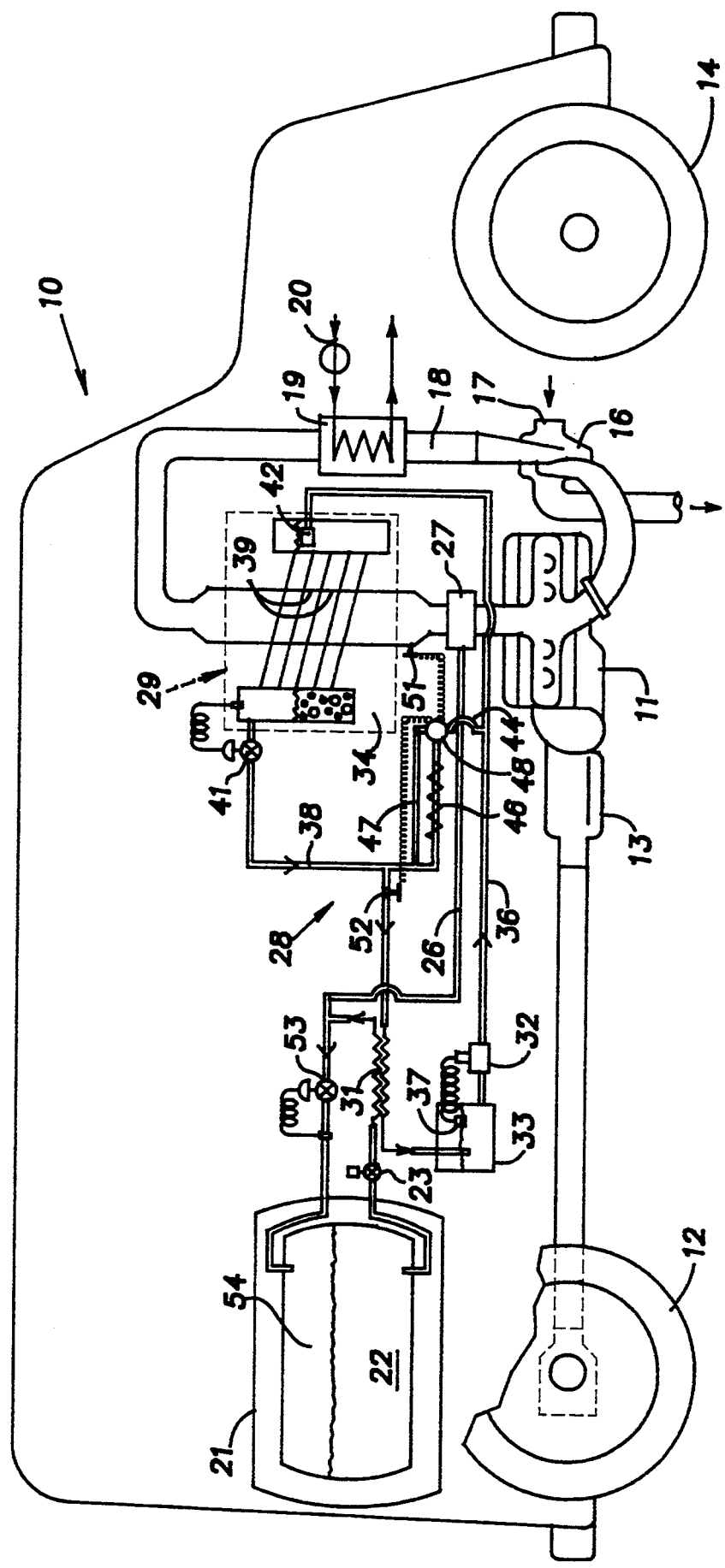

SECOND STAGE INTERCOOLING WITH PHASE CHANGE HEAT TRANSFER FLUID

BACKGROUND OF THE INVENTION

The present invention relates to air/fuel control systems for internal combustion engines and, in particular, to fuel control systems where the heat absorption capacity of a low temperature fuel is used to intercool compressed charged air.

PRIOR ART

My U.S. Pat. No. 5,081,977 discloses a system where fuel such as natural gas is maintained in a fuel tank at relatively low or cryogenic temperature enabling the gas to be stored in a liquid state at relatively low pressures. Heat is exchanged between compressed charge air and the fuel being consumed with the result that the density of charge air is advantageously increased and the fuel is vaporized and heated to near ambient conditions. A potential problem to be avoided is a tendency of frost to occur and build-up in the air circuit where the air contact surface is cooled by the cryogenic fuel at temperatures below freezing, i.e. substantially below 32° F.

SUMMARY OF THE INVENTION

The invention provides a system for conveniently intercooling compressed charge air and warming a cryogenic fuel as they are being consumed with an intermediate heat transfer fluid that exhibits phase change at respective heat exchanger surfaces. The phase change heat transfer fluid is circulated between zones where it is chilled and condensed by heat exchange with the low temperature fuel and is boiled or evaporated by heat exchange with the compressed charge air.

As disclosed, the temperature of the heat transfer fluid in the zone where it is cooling the charge air is conveniently and precisely controlled by regulating its vapor pressure to maintain the associated heat exchanger material in contact with charge air as close to the freezing point temperature as desired. Since the boiling or phase change point is directly related to its pressure it is relatively easy to maintain a desired operating temperature in this heat exchanger zone. Transient conditions in flow rates of the charge air or fuel do not have a significant effect on the accuracy of temperature control since a relatively small excess inventory of heat transfer fluid at both the evaporator and condenser zones is capable of accommodating transient flow conditions. This results from the relatively high heat of vaporization and condensation in the phase change of the heat transfer fluid. The phase change of the heat transfer fluid enables it to sacrifice or absorb high quantities of heat even for limited quantities of such material.

The disclosed system includes a bypass circuit that operates to direct the heat transfer fluid to an alternate heat source for vaporization when the intercooling heat exchanger surfaces have been cooled by heat exchange with the heat transfer fluid to a critical minimum control temperature for the avoidance of frost build-up. The system further includes another bypass circuit that is employed to avoid excessive heating of the heat transfer fluid which could otherwise raise the temperature of the fuel above the temperature of the charge air supply by a significant temperature differential which could make it difficult to accurately control the air-fuel ratio. Vaporized fuel can be selectively introduced into the ullage space of the fuel tank to ensure that an adequate supply of fuel will be afforded to the engine.

BRIEF DESCRIPTION OF THE DRAWING

The FIGURE is a diagrammatic representation of a fuel control system on a land vehicle embodying the present invention.

DESCRIPTION OF THE PREFERRED EMBODIMENT

Referring now to the drawing, there is illustrated a land vehicle 10 such as a truck, bus, locomotive or the like. Reference can be made to the disclosure of aforementioned U.S. Pat. No. 5,081,977 which is incorporated herein by reference for suitable controls and control strategies for operating the engine.

The vehicle 10 includes an internal combustion engine 11, preferably of the spark ignition, or pilot fuel injected ignition type, driving a set of propulsion wheels 12 through a drive train 13. A set of front wheels 14 can provide for steering of the vehicle in a known manner. The engine 11, in the illustrated example, is fitted with a conventional turbocharger 16. The turbocharger 16 utilizes energy from the exhaust of the engine 11 to compress charge air to be combusted by the engine 11. Charge air is drawn into an inlet 17 of the turbocharger 16 and is compressed to a pressure which when the engine is under load, is substantially above atmospheric pressure reaching, for example, 10 psig. Air compressed by the turbocharger 16 is substantially elevated in temperature as a result of the compression process which occurs externally of the engine 11. The charge air after compression in the turbocharger 16 is conducted by a supply conduit 18 to an intercooler 19 which is either of the air cooled type or of the water cooled type, both known in the art. A cooling fluid circuit for the intercooler 19 is shown at 20. The intercooler serves to cool the compressed charge air exiting the turbocharger 16 at a temperature of, for example, about 250° F. to a substantially lower temperature in the range of about 150° F., for example.

The engine 11 is supplied fuel from a fuel tank 21, carried on the vehicle 10. The fuel in the tank 21 is liquified natural gas or methane (hereinafter LNG) and natural gas vapor stored at cryogenic temperature of, for example, −260° F. and a pressure of, for example, at least 10 psi and usually not more than 75 psi. The tank 21, fuel lines and associated componentry carrying the fuel to the engine 11 are cryogenically insulated as needed according to known techniques.

Natural gas fuel 22 from the tank 21 is delivered successively through a shut-off valve 23, a heat exchanger 31 where it is vaporized and tempered and a line 26 to a throttle body fuel injector 27. A circuit 28 carrying a heat transfer fluid exchanges heat from the compressed charge air at a second stage intercooler 29 to the cryogenic LNG at the heat exchanger 31. As will be understood, the circuit 28, thus, beneficially cools the charge air and vaporizes the natural gas or methane fuel.

The circuit 28 includes a liquid pump 32 that circulates heat transfer fluid through various parts of the circuit 28. The pump 32 receives liquid heat transfer fluid from a liquid sump or reservoir 33 and directs it to a closed space or chamber 34 of the second stage intercooler 29 through a line 36. In the illustrated arrangement, the pump 32 is operated under the control of a float switch 37 to keep the inventory of liquid in the sump 33 at a predetermined normal operating level. The chamber 34 forms a boiler for the heat transfer fluid. Warm supply or charge air received from the first stage intercooler 19 transfers heat through heat conducting surfaces 39 of walls, fins or the like to the heat transfer fluid in the boiler chamber 34. The heat transfer fluid, received in the boiler chamber as a liquid, is vaporized and then conducted through a line 38 to the heat exchanger 31. At the heat exchanger 31, the heat transfer fluid vapor gives up heat to LNG flowing from the tank 21. The exchange of heat at the unit 31 causes the LNG to be vaporized and tempered and the heat transfer fluid vapor to be condensed to a liquid for return to the sump 33.

The boiling point temperature of the heat transfer fluid in the boiler chamber 34 is maintained to cool surfaces 39 of the second stage intercooler heat exchanger 29 contacted by the engine charge air at just above the freezing temperature of water carried in the engine supply air to avoid frost build-up on these surfaces. In the illustrated embodiment, this is accomplished by regulating the pressure in the chamber 34 with a pressure relief valve 41. The pressure relief valve 41, of known construction, opens to release vapor from the chamber 34 to the line 38 to the heat exchanger 31 whenever the pressure exceeds a predetermined value. This relief pressure is selected for the particular heat transfer fluid being used to yield a temperature of such fluid which, as mentioned, results in temperatures on the air contacting surfaces 39 of the intercooler 29 that are at least slightly above a frost temperature. One material having properties suitable for use as the heat transfer fluid is propane.

A liquid level or float control valve 42 maintains a limited excess volume of liquid heat transfer fluid in the boiler chamber 34. When the excess is sufficient, the valve 42 closes to prevent entry of additional heat transfer fluid; when the excess of the heat transfer fluid is depleted below a predetermined level, the valve 42 reopens to admit additional liquid heat transfer fluid. The heat transfer fluid circuit 28 includes a branch 44 with a heat exchanger 46 supplied with heat from an alternative heat source, besides that afforded by the charge air at the second stage intercooler 29. Such alternative heat source may be engine exhaust heat or engine jacket heat.

The circuit 28 further includes a branch 47 for bypassing the alternative heat source heat exchanger 46 at appropriate times. A control valve 48 responsive to sensors 51 and 52 respectively monitoring the temperature of air delivered from the second stage intercooler 29 to the engine 11 and the temperature or pressure of the heat transfer fluid upstream of the heat exchanger 31. The valve 48 directs the heat transfer fluid through either the heat exchanger 46 or the bypass branch 47 or both these branches depending on the signals from the sensors 51, 52 to maintain the temperature of the heat transfer fluid vapor near the temperature of the air entering the turbocharger inlet 17 to supply the engine 11. This vapor temperature level facilitates temperature control of the natural gas fuel vapor as it leaves the heat exchanger 31 heated by the heat transfer fluid vapor and allows this fuel vapor to be maintained near the air supply temperature.

A valve 53 responsive to pressure in the ullage space 54 of the fuel tank 21 admits vaporized LNG into the ullage space when the pressure is below a level necessary to supply adequate fuel to the engine 11. Introduction of this vaporized LNG adds enthalpy to the. LNG inventory in the fuel tank 21 resulting in a rise in vapor pressure which increases the delivery pressure of LNG to the heat exchanger 31 and downstream to the engine fuel injector 27.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A vehicle comprising an internal combustion engine, drive means connected to the engine to propel the vehicle, a fuel system including a fuel tank for storing liquid natural gas or methane fuel in a cryogenic liquid state, conduit delivery means for conveying said fuel from said tank to said engine, heat exchanger means associated with the delivery means for vaporizing the liquid fuel before it is introduced to the engine, means for compressing charge air for combustion in the engine, heat exchanger means for cooling the compressed charge air before it is introduced to the engine, and a heat transfer fluid circuit for transferring heat from the compressed charge air in the compressed charge air heat exchanger to the cryogenic liquid fuel in the liquid fuel vaporizing heat exchanger, the heat transfer fluid circuit including a circulating heat transfer fluid arranged to evaporate as it absorbs heat from said charge air heat exchanger and to condense as it gives up heat to said liquid fuel heat exchanger whereby the heat transfer between the charge air and liquid fuel is substantially accomplished by phase changes in said heat transfer fluid to thereby afford close control of the temperature of the charge air as it leaves said charge air heat exchanger.

2. A vehicle as set forth in claim 1, wherein the compressed charge air heat exchanger includes air contacting surfaces, and control means to regulate the temperature of the heat transfer fluid and, consequently, the temperature of the air contacting surfaces by controlling its pressure and thereby limiting the cooling Of the air contacting surfaces to a temperature that avoids build-up of frost.

3. A vehicle as set forth in claim 1, wherein said heat transfer fluid circuit includes an auxiliary heat exchanger providing an alternative heat source for heating said heat transfer fluid from a source of heat separate from said charge air heat exchanger.

4. A vehicle comprising an internal combustion engine, drive means connected to the engine to propel the vehicle, a fuel system including a fuel tank for storing liquid natural gas or methane fuel in a cryogenic liquid state, conduit delivery means for conveying said fuel from said tank to said engine, heat exchanger means associated with the delivery means for vaporizing the liquid fuel before it is introduced to the engine, means for compressing charge air for combustion in the engine, heat exchanger means for cooling the compressed charge air before it is introduced to the engine, and a heat transfer fluid circuit for transferring heat from the compressed charge air in the compressed charge air heat exchanger to the cryogenic liquid fuel in the liquid fuel vaporizing heat exchanger, the heat transfer fluid circuit including a circulating heat transfer fluid arranged to evaporate as it absorbs heat from said charge air heat exchanger and to condense as it gives up heat to said liquid fuel heat exchanger, said charge air heat exchanger including a closed chamber for receiving liquid heat transfer fluid and evaporating such liquid, and control means for limiting the level of liquid heat transfer fluid in said chamber.

* * * * *